April 17, 1951     A. L. VAN DER HEIDEN     2,549,034
MACHINE FOR MANUFACTURING BUTTONS OUT
OF PLATE MATERIAL
Filed Aug. 29, 1947     2 Sheets-Sheet 1
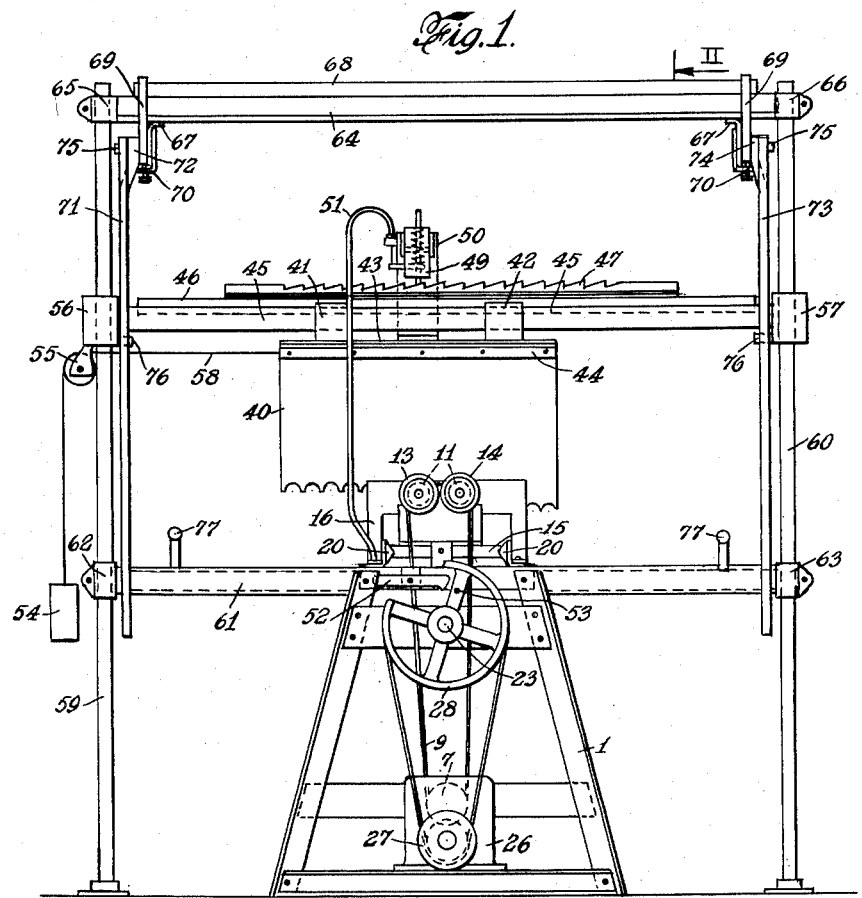
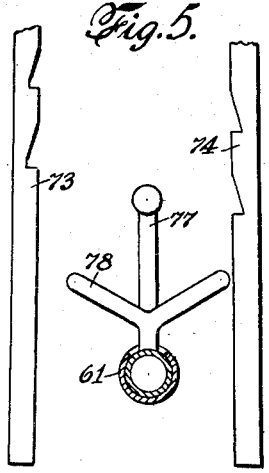
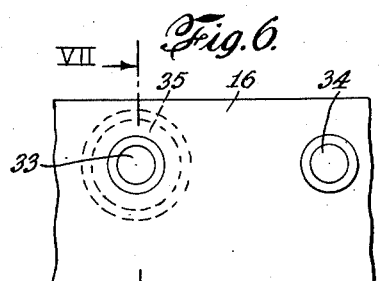
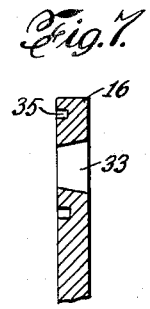
INVENTOR.
ARNOLDUS LAURENTIUS VAN DER HEIDEN
BY Robert E. Burns
ATTORNEY

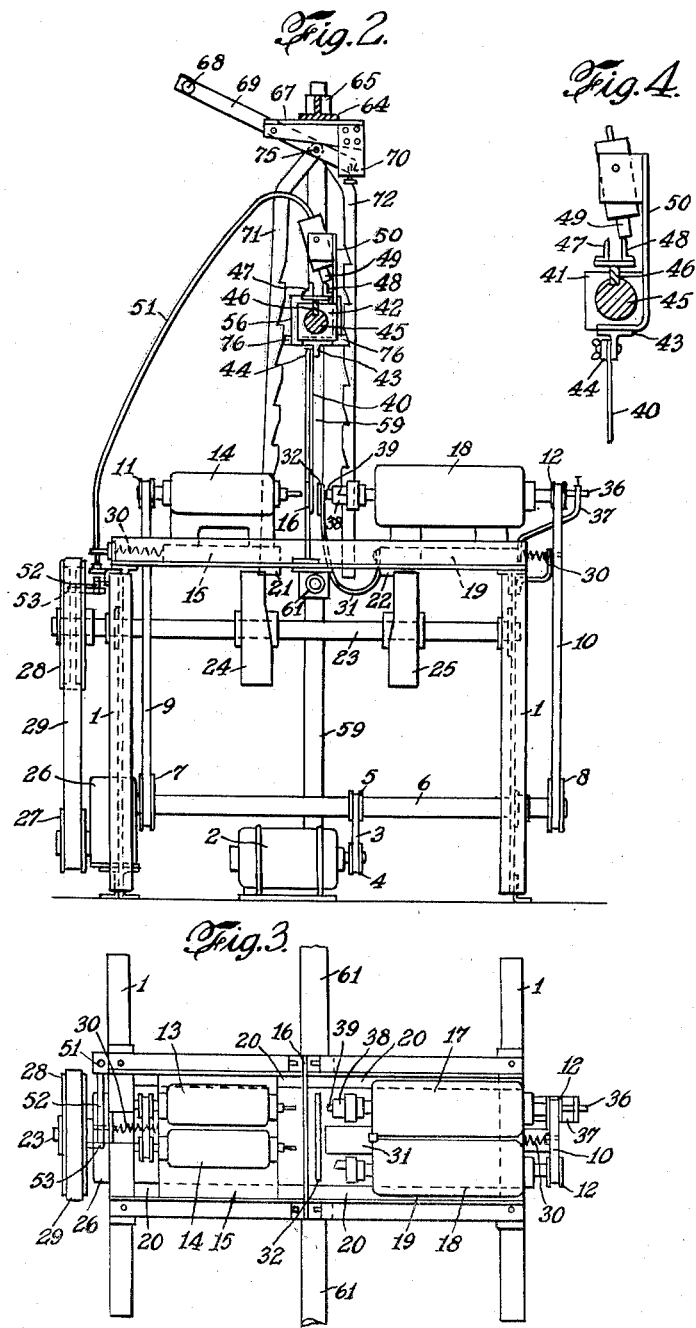

Patented Apr. 17, 1951

2,549,034

UNITED STATES PATENT OFFICE 2,549,034

MACHINE FOR MANUFACTURING BUTTONS OUT OF PLATE MATERIAL

Arnoldus Laurentius van der Heiden, Amersfoort, Netherlands

Application August 29, 1947, Serial No. 771,345
In the Netherlands September 13, 1946

5 Claims. (Cl. 79—3)

My invention relates to a machine for manufacturing buttons out of plate material, mainly consisting of a transport mechanism, to which a material plate can be fixed, which can be displaced stepwise over a definite distance with respect to a frame, on which is mounted a shaping apparatus, a drilling apparatus for drilling the fixing holes and a cutting out mechanism for the shaped buttons with fixing holes, which mechanisms are periodically brought to action during stillstand of the transport mechanism.

Such machines are well known in the art of button manufacture. They have a vertical column-shaped frame, at the outside of which the tooling apparatuses are arranged in a circle shaped track and are movable vertically up and down with respect to a ring-shaped table, on which narrow material strips can be fixed lying radially at regular distances and which table can be revolved stepwisely, so that after each revolution of the table, working as a transport mechanism, the material strips have passed all tooling apparatus. The little narrow material strips in this case must first be made to measure out of large material plates. Furthermore the dimensions of the small plates must necessarily be larger all around than the surface to be tooled, the use of such machines permit considerable waste of material. Furthermore, it is necessary for the operation of these machines to have one person in attendance steadily at each machine, as the small plates or slabs must be regularly reset or replaced.

My invention overcomes these disadvantages and provides a machine with which large material plates can be worked with a minimum of waste, while for the attendance one person suffices for each three or four machines.

According to my invention this is obtained by hanging the material plate on the transport mechanism above the frame with the tooling apparatus and moving it stepwise periodically in one direction transversally over this frame along a guide cam, which is fixedly mounted on the frame and on one or both sides of which the tooling apparatuses are arranged beside each other in the direction of the displacement of the material plate. In this way the subdivision of the material plate, which causes high material losses, becomes superfluous and a very high material efficiency with a minimum staff can be obtained.

The tooling apparatus can appropriately in known manner be mounted on slides on the frame and be controlled by curve discs. In this case the transport mechanism for the stepwise displacement of the material plate along the guide cam is provided with a displacing mechanism, mainly consisting of a saw toothed rack with pawl mechanism which is periodically actuated by a cam or the like on the driving arrangement of the curve discs. Hereby the periodical stepwise displacement of the material plate in the right moments is automatically obtained and assured.

The invention will now be described with reference to the drawings, in which an example of performance is shown. In the drawings:

Fig. 1 shows a front view of a machine according to the invention,

Fig. 2 shows a cross section according to the line II—II in Fig. 1,

Fig. 3 shows a top view of the frame with the tooling apparatus,

Fig. 4 shows a detail of the transport mechanism,

Fig. 5 shows a detail of the control mechanism for the height change of the transport mechanism, and Figs. 6 and 7 show a front elevation and cross section according to the line VII—VII in Fig. 6 of the middle part of the guide cam, along which the material plate is lead.

The machine shown in the drawings by way of example mainly consists of a frame which carries the tooling apparatus with the driving and control mechanism therefor, as well as a carrying frame built over this frame, carrying the transport mechanism for the material plate and the control mechanism for the horizontal and vertical displacements thereof. The frame 1 carries a spindle 6 which is driven by a driving motor 2 by means of a belt transmission 3 over pulleys 4 and 5. This driving shaft 6 carries two pulleys 7 and 8 which drive the tooling apparatus by means of belts or strings 9 and 10 and small pulleys 11 and 12. The tooling mechanisms in this case consist of two drilling apparatuses 13 and 14, which are mounted on a common slide 15 on one side of the guide cam 16 and a turn-off or shape-forming apparatus 17 and a drilling out or cutting out apparatus 18, which are commonly arranged on a second slide 19 on the other side of the guide cam. The guide cam 16 is fixedly connected on the frame while the slides 15 and 19 are slidably mounted in the frame between a pair of guides 20 and thus are movable to or from the guide cam 16. For this purpose the slides are each furnished with a roll 21 resp. 22 at the bottom side, which rolls each cooperate with a curve or groove disc 24 resp. 25 which are mounted on a spindle 23. The spindle 23 is rotatably mounted in the frame 1 parallel to the driving spindle and is driven from this last mentioned spindle over a reduction gear 26 and the discs 27 and 28 with the belt or string transmission 29 with a relatively low speed, for instance 30–60 revolutions/min. In order to keep the rolls 21 and 22 cooperating with the curve discs, which are applied in this case, and at the same time to withdraw the slides with the tooling apparatus after each working period, pull springs 30 are fixed to the rear ends of the slides, which springs on the other sides are adjustably connected to the frame 1. Further a relatively strong blade spring 31 is fixed on the front side of the slide 19, which spring carries a catch or press plate 32 at its free end, which serves to press or catch the material plate, for instance of artificial horn, out of which the buttons are to be made, against the guide cam 16 each time before the tooling apparatus is activated. The press plate is, of course, furnished with openings or recesses for letting the tools of the tooling apparatus pass. Also the guide cam 16, as shown in Figures 6 and 7, is provided with through borings 33 and 34, in order to let the drill tools pass, and with a ring shaped recess 35 for the cutting out device. The guide cam is furthermore arranged slightly adjustable on the frame 1, in order to enable an easy adjustment of the thickness of the buttons to be manufactured. To prevent the buttons from sticking in the cutting device, the cutting device has a spindle which is made hollow and a bar 36 is lead through this hollow spindle, which is fixedly connected with its free end to an arm 37, which in turn is fixedly connected to the slide 19. At the other end, the bar 36 carries a rejecting stamp 39, which lies in the hollow of the flat jumper tool 38 which is resiliently arranged on the bar. As will be seen from the drawings the drilling device 13 stands co-axially opposite to the cutting-out device 17, the rejecting stamp 39 moreover is made hollow, in order to let the end of the drilling tool pass. This, of course, is of special importance since the tooling devices are brought into cooperation simultaneously with the material plate at each time operation. For the constructions in which the slides are brought in to cooperation with the plate after each other in every working period, this opening only serves for safety.

The material plate 40 from which the buttons are to be made, as mentioned above, is lead between the guide cam 16 and the press and catch plate 3 and is displaced stepwise, each time between two working periods of the tooling apparatus, over a distance which is preferably chosen in such a manner that no intermediate borders will be formed on the plate. For this purpose the plate is hung with its upper rim on a transport mechanism, preferably by clamping. This transport mechanism mainly consists of a slide, formed by two blocks 41 and 42 which are mutually connected at the bottom side by a T-profile strip 43 of a length equal to the plates to be worked. The leg of the T-profile which points downwardly at the same time serves as a fixed clamping rim, against which, for the clamping of the material plate, a flat metal strip 44 can be pressed with screws. This press strip is preferably provided with small projections at definite places along the clamping rim, for instance by a separate clamping screw, which projections can be pressed into the plate and thus enable a completely fixed clamping of a very narrow plate rim. The blocks 41 and 42 are slidably arranged over a round rod 45. In order to prevent possible swinging back and forth of the plate, the blocks 41 and 42 are provided with a slot in the upper wall, through which passes a guide rail 46, which is fixedly connected on the round rod 45. This guide rail is a little higher than the blocks and carries two saw toothed racks 47 and 48, which are both provided with a toothing having a pitch corresponding to the required displacement between two working periods of the tooling devices, but which are mutually displaced half a pitch. These saw toothed racks can alternately be brought in cooperation with a resilient pawl mechanism 49 which for this purpose is connected revolvably to a carrier 50 which is fixedly arranged on the T-profile strip 43 between the two blocks 41 and 42 of the slide. For the periodical actuation the pawl mechanism 49 is connected by means of a Bowden cable transmission 51 with a lever 52 which in this case is revolvably mounted at the front side of the frame 1 and which cooperates with a pawl lifter 53 which is fixed on one of the spokes of the pulley 28, so that the pawl mechanism is actuated each time after a revolution of the pulley 28. The slide of the transport mechanism at each operation makes a jump of a toothpitch of one of the toothed racks 47 or 48 in consequence of the working of the weight 54, which is connected with the slide of the transport mechanism by a cable 58 running over a roll 55 on one of the guide blocks of the round rod 45. The whole transport device is further slidable up and down without lateral play, by means of two blocks 56 and 57 at the ends of the rod 45, along two vertical columns 59 and 60, resting on the ground on both sides of the frame 1, and held in the right position with respect to this frame, by a hollow rod 61 which passes under the slide guide of the frame on the spot of the guide cam 16 and is fixedly connected to this frame and the ends of which are fixedly connected with clamps 62 and 63 to the vertical columns 59 and 60 of the carrying frame. At the upper end these columns moreover are mutually fixedly coupled by a cross beam 64 with converted T-profile and clamps 65 and 66. At both ends of the cross beam 64 a pair of levers 69, mutually fixedly connected by a longitudinal bar 69, are revolvably mounted on transverse arms 67 projecting forward and backward. The center of rotation of the levers lies before the carrying frame and behind the frame the transverse arms 67 carry an adjustable stop 70 for the off-position of the levers 69. In the plane of the carrying frame the two levers 69 each carry a pair of mutually parallel saw toothed racks 71—74, which are bent together at the fastening point. These saw toothed racks at each end of the carrying frame hang along the front and rear side of the guide blocks 56 and 57, which are provided with detentions 76 near the bottom ends projecting on both sides on the same level. These detentions can alternately cooperate with the toothing of the saw toothed racks at the front and rear side of the carrying frame, as the toothed racks have, taken in pairs on the front and rear side of the frame, a toothing with a pitch which is equal to the double of the required vertical displacement of the transport mechanism (see Fig. 5) after the plate has completely gone through the machine. If the transport mechanism rests on a couple of teeth of both racks on the front side, it can be lowered over the required distance by drawing or pressing these toothed racks simultaneously to the front. The transport mechanism than falls parallel to itself in the next lower couple of teeth of the two toothed racks on the rear side of the frame, etc. This alternate pressing away of the carrying pair of toothed racks can take place by operating one of the handles 77. These handles are connected, through slots of definite length made in the hollow rod 61 to a spindle lying inside the hollow rod, which carries a widely forked member 78 (Fig. 5) between every pair of toothed racks 71, 72 and 73, 74 at each end of the frame. These members are also connected to the spindle through slots in the hollow rod 61. As the spindle with the handles and the forked members in the middle position will be in unstable balance, it will always remain in the position in which is lastly adjusted and thereby attendant errors will be practically excluded.

The machine herein shown and described stands in a position in which the pulley 28 with the pawl lifter 53 has just passed the lever 52, so that the transport mechanism has just displaced the plate 40 one step further under influence of the weight 54. The press and catch plate 32 still leaves the plate free and the slides 15 and 19 with the tooling devices are completely withdrawn under influence of the return springs 30. With the further rotations of the pulley 28 and the spindle 23 with the curve discs 24 and 25 the slide 19 is first pushed forward so far that the press and catch plate 32 presses the plate 40 firmly against the guide cam 16. The tools of the tooling apparatuses which are arranged on this slide do not as yet touch the plate. Then the slide 15 with the drilling apparatuses 13 and 14 are moved to and fro by the curve disc 24, so that the fixing bores are drilled and immediately afterwards the slide 19 is moved further forward and entirely backwards. At this point the plate is turned off or shaped at a new spot and at the same time a shaped button provided with fixing bores is turned out or cut out on the fourth tooling place from there and is thrown out by the resilient rejecting stamp 39. In this case the fixing bores are drilled on the second and fourth tooling place. On the third tooling place the plate is not treated. Meanwhile the pulley 28 has completed its revolution and the pawl mechanism 49 of the transport mechanism is actuated again, whereby the transport mechanism again moves the plate one step further and the play begins new. When the plate has completely passed through the machine, it has to be pushed back to the start position while the transport mechanism has to sink "one line distance." This "line distance," however, in practice is preferably chosen in such a manner, that the buttons are partially cut out of the material peaks formed by the cutting-out places of the preceding "line," in order that as little as possible of the material will be lost. The tooling places of the next "line" consequently have to come rather above and between those of the proceeding line and the "line distance" then is not equal to the distances between the tooling places in a "line." In this case the pawl mechanism 49 at the same time must be switched over on the other toothed rack of which the teeth are displaced half a pitch. When pushing back the plate, the material peaks could either stick on the closed press plate 32 or they could be caught when passing the press plate, which is going back and forth, and then would be locally spoiled. To avoid this, the plate can be lifted before pushing back by pulling down the levers 69 by means of the rod 68. Then the transport mechanism can be returned to the starting position by hand, free of the pressing device 31, 32 and against the action of the weight 54. In the starting position the levers 69 are allowed to return again, but the transport mechanism is still held for a short time. Meanwhile the pawl mechanism 49 is switched over by hand on the other of the toothed racks 47 and 48 and the transport mechanism is lowered one "line" by turning one of the levers 77. Then the transport mechanism can be loosened which then slides through until the pawl 49 engages with the first tooth. The machine then further works full automatically a new "line." The cut out finished buttons are caught by a collecting tray (not shown). The waste is sucked away by suction mouth pieces (also not shown).

My invention is described above by way of reference to an example of performance, but I do not desire to be limited thereto as variations can be obtained within the scope of said invention. So the two toothed racks 47 and 48 can also be fixed on the blocks 41 and 42 and the pawl mechanism 49 on the guide rail 46. Then the pawl mechanism stands still, so that the Bowden cable transmission 51 can be shorter.

For the manufacture of buttons with a not rotary symmetrical profile the shaping apparatus can be put out of action and the button discs with the fixing holes can be shaped separately in the usual manner.

The machine can also be operated in such a manner that after the clamping of the plate with the pressing device 32 at first the shaping and cutting out apparatus are brought to action and after this the drilling apparatus.

The number of working periods can further be diminished with large buttons and further by using a construction which is as compact as possible with thin bearing boxes for the tooling apparatus.

For the manufacture of buttons with four fixing holes the slide with the drilling apparatus can be moved to and fro twice per working period and lifted either only at the front end or wholly between the first and second operation. This can be achieved by a suitable performance of the curve discs or cam discs.

The tooling apparatuses 13 and 14 are appropriately mutually adjustable in transverse direction on the slide 15, in order to be able to change the mutual distance of the fixing holes while the tooling apparatuses 17 and 18 are appropriately each adjustable in longitudinal direction with respect to the slide 19, in order to be able to reckon with the shortening of the tools owing to regrinding.

Still other modifications within the scope of the invention will be apparent to those skilled in the art.

Having now particularly described and ascertained the nature of my said invention and in what manner the same is to be performed, I declare that what I claim is:

1. A machine for manufacturing buttons out of a material plate, comprising a frame, a horizontal tool table on said frame, a plate carrier provided with means for holding a material plate hanging vertically down from its underside, said carrier being mounted on said frame and above said table for horizontal and vertical movement in the plane of a material plate carried thereby, means for moving said carrier intermittently and step by step over a definite distance in at least one horizontal direction, a vertical guide plate on said table for guiding the lower side of said hanging material plate, machine tooling devices mounted side by side on said table on at least one side of said guiding plate and facing said material plate, a driving mechanism bringing said tooling devices periodically into working contact with said material plate during the periods of standstill of said carrier, and a clamping member movably mounted on said table adapted to press said material plate against said guide plate when said tooling devices are acting on said material plate, said driving mechanism controlling said carrier moving means and said movable clamping member.

2. In a machine for manufacturing buttons out of a material plate, the combination of a number of machine tooling devices for successively drilling and cutting out buttons from said material plate and driving means for said tooling devices, with a transport mechanism for moving said material plate step by step across said tooling devices, said transport mechanism comprising a horizontal bar guided for vertical movement above said tooling devices, a carrier member slidable along said bar, and provided with means for holding a material plate hanging vertically down from its underside, means exercising a force on said carrier tending to move the latter in one horizontal direction, at least one saw toothed rack and a pawl mechanism cooperating with said toothed rack mounted on said bar and on said carrier member, the pitch of said toothing being slightly greater than the diameter of the buttons to be made, and means for lifting the pawl of said pawl mechanism thereby to disengage said pawl from one tooth of said rack until it is caught by the next tooth upon the subsequent movement of the carrier, said pawl lifting means being periodically actuated by said driving means for said tooling devices at the end of each working cyclus for a button.

3. In a machine for manufacturing buttons out of a material plate, the combination of a number of machine tooling devices for successively drilling and cutting out buttons from said plate and driving means for said tooling devices, with a transport mechanism for moving said material plate step by step across said tooling devices, said transport mechanism comprising two vertical columns, a horizontal bar guided by said columns for vertical movement above said tooling devices, a carrier member slidable along said bar and provided with means for holding a material plate hanging vertically down from its underside, means exercising a force on said carrier tending to move the latter in one horizontal direction, two parallel saw toothed racks on said bar, each having teeth with a pitch slightly greater than the radius of the buttons to be made, the teeth of one rack being displaced over a distance of half a pitch with respect to the teeth of the other rack, a pawl mechanism adjustably mounted on said carrier member for cooperation with either the one or the other of said toothed racks, means for lifting the pawl of said pawl mechanism thereby to disengage said pawl from one tooth of a rack until it is caught by the next tooth upon the subsequent movement of said carrier, said pawl lifting means being periodically actuated by said driving means for said tooling devices at the end of each working cyclus for a button, and means for moving said horizontal bar downward over a distance somewhat smaller than the diameter of a button after said pawl mechanism has moved along the teeth of one rack and is shifted to successively engage the teeth of the other rack.

4. A machine according to claim 3, in which the means for controlling the downward movement of said horizontal bar comprises at least one pair of spaced parallel saw toothed racks pivotally connected to the top end of one of said columns in a plane perpendicular to said horizontal bar substantially vertically hanging down from said column, each having teeth with a pitch equal to twice the distance of the required downward displacement of the material plate when the latter has made a complete horizontal passage across the tooling devices, the teeth of one rack being shifted over a distance of half a pitch with respect to the teeth of the other rack, and two opposed fixed cams on said horizontal bar between said two racks, each cooperating with one of said teeth in such a way that upon the shifting of said pair of racks to one side one of said cams engages a tooth of one of said racks and upon the shifting of said pair of racks to the other side said first cam is disengaged and said bar slides downwards until the other cam engages a tooth of the other rack.

5. A machine for manufacturing buttons out of a material plate, comprising a frame, a horizontal tool table on said frame, a plate carrier provided with means for holding a material plate hanging vertically down from its underside, said carrier being mounted on said frame and above said table for horizontal and vertical movement in the plane of a material plate carried thereby, means for moving said carrier in one horizontal direction along said bar, toothed rack and pawl means on said bar and said carrier controlling a step by step movement of the latter over definite distances in said direction, second toothed rack and pawl means on said frame and said bar controlling a downward movement of the latter, over a definite distance at the end of each horizontal movement, means for lifting said carrier in a direction away from said table at the end of each of said horizontal movements to allow it to be moved back over said bar, a guide plate on said table guiding the lower end of said plate material, a tooling device for turning and a tooling device for cutting out buttons from said material plate mounted side by side on a slide on said table on one side of said guide plate, at least one tooling device for drilling holes mounted on a second slide on said table on the opposite side of said guide plate, rotatable curved discs acting on said slides to move the same periodically towards said guide plate to bring said tooling devices in working contact with said material plate, elastic clamping means on one of said slides engaging said material plate to press it against said guide plate during said working contact, driving means for said tooling devices and said discs, and coupling means between said driving means and said first pawl means periodically actuating the latter when said slides have been moved away by said discs from said material plate to allow a movement of one step of said plate carrier.

ARNOLDUS LAURENTIUS
VAN DER HEIDEN.

REFERENCES CITED

The following references are of record in the file of this patent:

UNITED STATES PATENTS

| Number | Name | Date |
|---|---|---|
| 218,640 | Parmelee | Aug. 19, 1879 |
| 669,473 | Blood | Mar. 5, 1901 |
| 813,351 | Clough | Feb. 20, 1906 |
| 1,005,622 | Eisenbeis | Oct. 10, 1911 |

FOREIGN PATENTS

| Number | Country | Date |
|---|---|---|
| 458,022 | France | July 26, 1913 |